United States Patent [19]

Annis

[11] 4,399,337

[45] Aug. 16, 1983

[54] TRANSMISSION SELECTOR ROD SEAL

[75] Inventor: Gerald A. Annis, Pittsford, N.Y.

[73] Assignee: Schlegal Corporation, Rochester, N.Y.

[21] Appl. No.: 203,507

[22] Filed: Nov. 3, 1980

[51] Int. Cl.$^3$ ............................................. H01H 15/00
[52] U.S. Cl. ................................. 200/16 B; 200/302; 277/53; 277/237 R
[58] Field of Search ................. 200/16 R, 16 A, 16 B, 200/16 C, 16 D, 16 E, 16 F, 164 R, 164 A, 252, 302; 339/DIG. 3; 428/85; 174/35 GC; 277/237 R, 53

[56] References Cited

U.S. PATENT DOCUMENTS

| 1,325,950 | 12/1919 | McClure . | |
|---|---|---|---|
| 2,114,638 | 4/1938 | Parker . | |
| 2,302,003 | 11/1942 | Cadwell et al. . | |
| 2,486,042 | 10/1949 | Lesigne | 200/164 R |
| 3,022,253 | 10/1961 | Kessler . | |
| 3,286,322 | 11/1966 | Sneary . | |
| 3,468,694 | 9/1969 | Moritz et al. | 428/85 |
| 3,783,173 | 1/1974 | Twomey . | |
| 3,889,043 | 6/1975 | Ducros . | |
| 3,914,570 | 10/1975 | Lockard | 200/16 D |
| 3,935,043 | 1/1976 | Kessler | 428/85 |
| 3,940,585 | 2/1976 | Schaad | 200/16 C |
| 4,010,004 | 3/1977 | Brown et al. . | |
| 4,014,557 | 3/1977 | Bragg . | |
| 4,157,740 | 6/1979 | Jackson . | |

Primary Examiner—A. T. Grimley
Assistant Examiner—Morris Ginsburg
Attorney, Agent, or Firm—Cushman, Darby & Cushman

[57] ABSTRACT

A transmission rod selector assembly is provided including a novel seal for the housing at the entrance of the selector rod. The seal includes a woven or knit pile fabric having a first section with a resilient fiber pile, a second section including a low-friction fiber pile, a third section including a resilient fiber pile, and a fourth section including an electrically conductive fiber pile. The fabric strip is electrically connected to an accessory component, such as a lean burn system.

22 Claims, 4 Drawing Figures

TRANSMISSION SELECTOR ROD SEAL

BACKGROUND AND SUMMARY OF THE INVENTION

Conventional transmission selector rod assemblies include a transmission selector rod which extends through a seal into a housing. The seal conventionally comprises a rubber boot covering a portion of the rod and the housing. While such a structure performs its desired sealing function, it is relatively heavy, requires a secondary attachment, and is not readily installed and lends itself to failure due to cracking and pull-off from the housing. Conventional transmission selector rod assemblies also include a switch attached to the housing and associated with the selector rod to effect electrical control of a particular electrical component (e.g. a lean burn system) of the motor vehicle with which the transmission selector rod assembly is associated. The switch is relatively expensive, and adds further weight to the system, and requires additional assembly.

According to the present invention, it is possible to provide a seal for a transmission selector rod that overcomes the disadvantages associated with conventional structures, as recited above. According to the present invention, it is possible to reduce the weight and size of the transmission selector rod housing assembly, provide a seal that is self contained and easily installed, and one that does not require a secondary attachment, could replace a bearing that otherwise would be molded into the housing unit, and to eliminate the switch commonly associated with the transmission selector rod assembly. These advantageous results are accomplished according to the present invention while an excellent seal is still provided, which seal prevents foreign material from entering the housing.

According to one aspect of the present invention, a transmission selector rod assembly is provided. The assembly includes the conventional components of a housing and means defining an opening into the housing for receipt of a transmission selector rod, to allow the selector rod to move back-and-forth with respect to the housing. According to the present invention the means for providing a seal at the opening to engage the selector rod and seal the housing from the surrounding environment includes a pile fabric strip having at least some electrically conductive fibers, and means for mounting the fabric strip surrounding the opening so that the pile (including at least some electrically conductive fibers) extends radially inwardly from a position surrounding the opening to engage the selector rod when received within the opening. According to the present invention the assembly further comprises an electrical conductor electrically connected to the fabric strip and extending away from the housing, to provide an electric circuit with the fabric strip and an accessory electrical component (such as a lean burn system). The metal transmission selector rod has a plurality of spaced electrically nonconductive portions formed on the surface thereof, while the fabric strip may have the electrically conductive fibers thereof formed in a section with a predetermined width, the nonconductive portions formed on the surface of the selector rod having a width slightly greater than the width of the section of conductive fibers. Such an arrangement effects the switching conventionally provided by the switch, and allows elimination of that structure without consequent loss of the switching function.

The fabric strip for providing the seal according to the present invention preferably includes a number of different sections. A first section including a resilient fiber pile, and a third similar section, are disposed on either side of a second section including a low-friction fiber pile. Backings may be provided for all or some of the various section fiber piles, and the backings may be received by one or more recesses formed in the housing in communication with the opening. The second section serves as a bearing strip in the housing. In this way a proper seal is provided while resistance to the back-and-forth movement of the transmission selector rod is minimized. A fourth section of electrically conductive fibers may be disposed between the second and third sections.

The fibers forming the fabric strip may be chosen from a wide variety of conventional fabrics. In this regard, the term "pile" as used in the present specification and claims is used in its broadest sense, covering cut or uncut loops in general which make up the surface of a pile fabric. The fibers of the resilient fiber pile may comprise silicone wool, natural wool, or other fibers having resilient properties similar to silicone and natural wool. The fibers of the low-friction fiber pile are preferably polytetrafluoroethylene fibers, although a wide variety of other fibers having friction properties similar to polytetrafluoroethylene may be provided. All sections may be provided as a blend of different fibers rather than being homogeneous. For the backed sections, the backing preferably is provided by polypropylene. Polypropylene fibers are preferably provided in such backed sections to provide compatibility with the backing. The electrically conductive fibers may include stainless steel fibers. The woven fabric strip combining all the sections may have the plan configuration of a parallelogram for ease of wrapping and installation.

The preferred fabric strip according to the present invention is eminently suited for use in the transmission selector rod assembly. However, the fabric is not restricted to that use, and can be utilized in other environments where similar properties are desirable.

It is the primary object of the present invention to provide an advantageous sealing arrangement. This and other objects of the invention will become clear from an inspection of the detailed description of the invention, and from the appended claims.

DETAILED DESCRIPTION OF THE DRAWINGS

Figure 1:
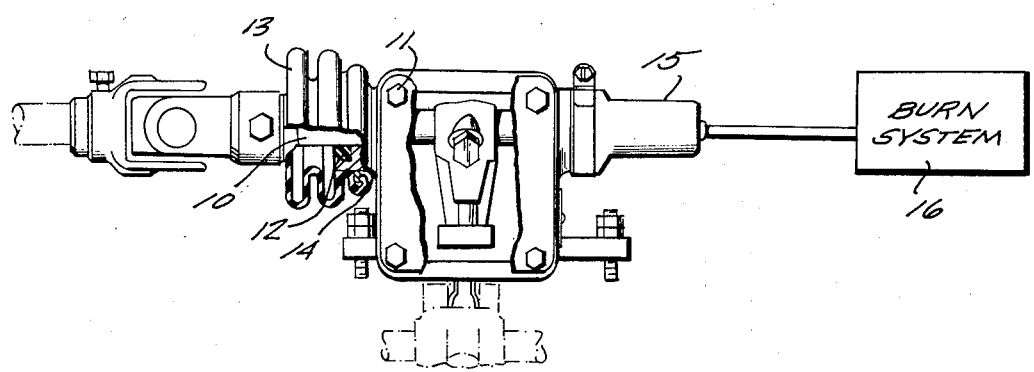
FIG. 1 is a side view partly in cross-section and partly in elevation of an exemplary prior art transmission selector rod assembly.

An exemplary prior art transmission selector rod assembly, over which the present invention is designed to be an improvement, is illustrated in FIG. 1. The transmission selector rod 10 enters housing 11 through an opening, a bearing strip 12 being provided surrounding the rod 10 at the opening to the housing 11. A large rubber boot 13 surrounds and is attached to the rod 10 and to the housing 11, attachment to the housing 11 being indicated by a portion of boot 13 fitting over raised flange 14. A switch 15 conventionally is provided, normally comprising a micro-switch which is actuated by the rod 10 in response to various positions of the rod to which it has been moved by the gear shift lever. The switch controls an accessory electrical component, such as a lean burn system illustrated schematically at 16, the lean burn system being actuated when the rod is at various positions (e.g. in gear), and deactuated when the rod 10 is in further positions (e.g. out of gear).

Figure 2:
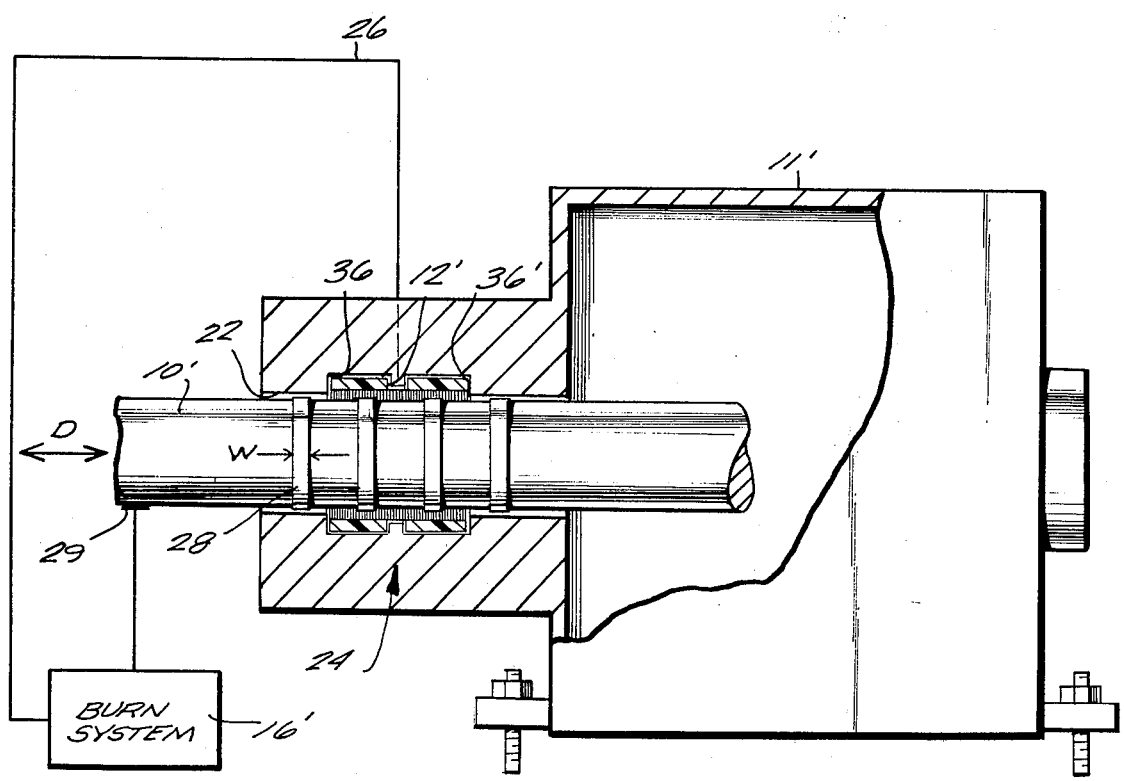
FIG. 2 is a side detail view, partly in cross-section and partly in elevation, illustrating a portion of an exemplary transmission selector rod assembly according to the present invention.

An exemplary transmission selector rod assembly according to the present invention is illustrated generally at 20 in FIG. 2. Components of the assembly 20 comparable to those of the prior art assembly of FIG. 1 include the transmission rod 10', the housing 11' having a bearing strip 12' surrounding the opening through which the rod 10' reciprocates, and the accessory electrical components such as lean burn system 16'. According to the present invention, however, the large rubber boot 13 of the prior art system is replaced by a fabric sealing system, and the switch 15 is eliminated. The assembly 20 will generally have less weight than the assembly illustrated in FIG. 1, has fewer components, and should be easier to install. Additionally, according to the present invention the strip 12' may or may not be provided.

According to the present invention, means are provided for providing a seal at the opening 22 into the housing 11', which opening 22 receives the rod 10' therein, the seal engaging the rod 10' and sealing the housing 11' from the surrounding environment, and preventing the passage of contaminants into the housing 11'. The sealing means includes a pile fabric strip, shown generally at 24 in FIGS. 3 and 4, and means for mounting the fabric strip 24 surrounding the opening 22 so that the pile of the fabric strip 24 extend radially inwardly from a position surrounding the opening, to engage the selector rod 10'.

In order to eliminate the switch 15, at least some electrically conductive fibers are associated with the fabric strip 24, and at least some of those electrically conductive fibers are in engagement with the rod 10'. An electrical conductor 26 is also provided in the assembly 20, the conductor (such as a wire) being electrically connected to the fabric strip and extending away from the housing 11', to provide an electric circuit with the fabric strip 24 and an accessory electrical component, such as burn system 16'. The conductor 26 may be connected to the housing 11' itself (if the housing 11' is of conductive material), or it may be directly connected to electrically conductive fibers of the fabric strip 24.

The preferred electrical connection provided by the assembly 20 is illustrated in FIG. 2. The rod 10' is conventionally metal, and a plurality of electrically non-conductive strips 28 may be disposed on the surface of the rod 10'. The fabric strip 24 includes a section of predetermined width, which may be slightly less than the width W of the strips 28, engaging the rod 10'. The rod 10' also is in sliding contact with an electrical contact 29, connected to ground or to the burn system 16' depending upon the particular nature of the electrical components of the system 16'. As the rod 10' is reciprocated in dimension D, the non-conductive portions 28 ultimately come in contact with the electrically conductive fibers of the fabric strip 24, breaking the circuit effecting operation of the lean burn system 16'. When the portions of the metal rod 10' between the non-conductive portions 28 contact the electrically conductive fibers of the fabric strip 24, completion of the electric circuit initiating operation of the system 16' is effected.

The fabric strip 24 may take a wide variety of forms. One particular form that is advantageous in accomplishing the desired results according to the present invention is that illustrated in FIGS. 3 and 4. In this form, the fabric strip comprises a woven pile fabric having a first section A including a resilient fiber pile 30 (see FIG. 4), a second section B including a low-friction fiber pile 31, and a third section A' comparable to section A, including a resilient fiber pile 30'. The second section B is between the sections A, A'. In the embodiment illustrated in FIGS. 2 and 4, the fabric 24 also includes a fourth section C including an electrically conductive fiber pile including fibers 32.

The fabric strip 24 preferably has at least some of the sections thereof backed. Preferably, sections A and A' have a backing 34, 34', respectively. The backing is preferably a plastic backing, such as a polypropylene backing, and is applied in any conventional manner. Some fibers in the pile of sections A, A' are compatible with the fibers of the backing 34, 34' (e.g. some polypropylene fibers are provided).

Figure 3:
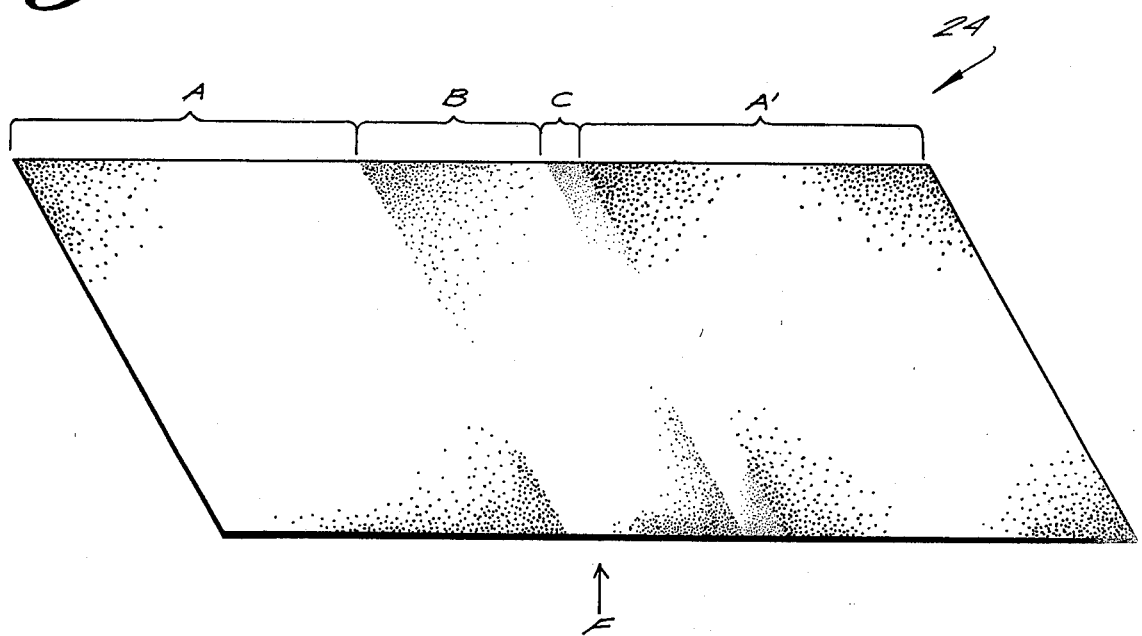
FIG. 3 is a top plan view of an exemplary fabric strip according to the present invention.
Figure 4:
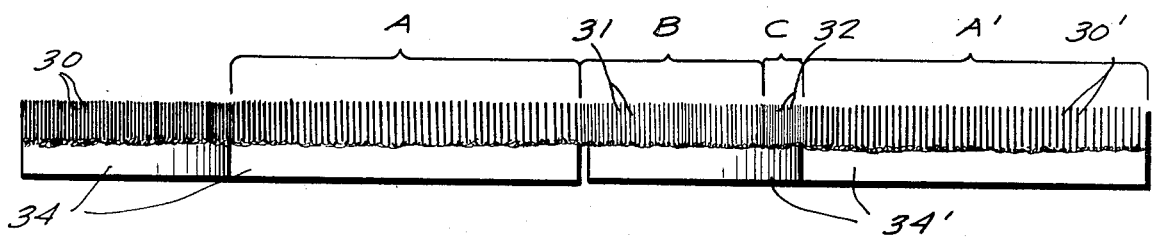
FIG. 4 is a side view, looking in the direction of the arrow F, of the fabric strip of FIG. 3.

The fabric strip 24 illustrated in FIGS. 3 and 4 is constructed in the manner in which it is in order to most effectively provide a seal for the transmission selector rod assembly 20, as illustrated in FIG. 2. Means are provided defining a pair of spaced recesses 36, 36' communicating with the opening 22, and disposed on either side of the bearing strip 12'. The backing 34 is received by the recess 36, and the backing 34' is received by the recess 36', the backings serving to properly retain the seal in place with respect to the selector rod 10'. The second section B of low-friction fibers covers the bearing strip 12' to provide a minimum resistance to movement of the rod 10' in dimension D, while the resilient fibers 30, 30' of sections A, A' provide an effective seal preventing contamination of the interior of the housing 11'. The relatively small conductive fiber section C provides the switching function, as heretofore described.

Where no bearing strip 12' is provided, a single recess comparable to recesses 36, 36' communicates with the opening 22. All the sections of the fabric strip may be backed, or unbacked.

The piles may include cut or uncut loops, cut loops being illustrated in FIG. 4. The fibers 30 may be chosen from a wide variety of conventional fibers, such as natural wool, silicone wool, and fibers having resilient properties similar to silicone wool and natural wool. The low-friction fibers 31 may also be chosen from a wide variety of fibers, such as polytetrafluoroethylene and fibers having friction properties similar to polytetrafluoroethylene. The conductive fibers 32 may be any suitable pure conductive fibers, such as stainless steel fibers, or may be non-conductive fibers coated with conductive material, or the like.

While the invention has been described with respect to a reciprocating rod 10', by reorientation of the conductive fibers 32 to extend perpendicular to and through the sections A, B, and A', and by alignment of the non-conductive strip 28 in the direction of rotation of the selector shaft, a seal for a rotatable shaft could alternatively be provided.

OPERATION

The fabric strip 24 is constructed by knitting or weaving a fabric having a first section A with resilient fibers 30 forming a pile, a second section B having low-friction fibers 31 forming a pile, a fourth section C having electrically conductive fibers 32 forming a pile, and a third section A' having resilient fibers 30' forming a pile. Polypropylene backing 34, 34' is then applied to the sections A, A' by conventional techniques, while the sections B, C may remain un-backed. The fabric is then cut into a fabric strip, such as one having a parallelogram shape in plan, as illustrated in FIG. 3.

After construction of the fabric strip 24, it is readily mounted in place by disposing it within the opening 22, laying the backings 34, 34' in the recesses 36, 36', and wrapping the strip around the inside of the opening with the low-friction fibers 31 acting as or overlaying the bearing strip 12'. Suitable non-conductive portions 28 having a width W greater than the width of the conductive fiber section C are spaced along the rod 10', and the rod 10' is mounted for reciprocation in dimension D with respect to the casing 11' to effect gear selecton. The casing 11' and the rod 10' are connected up to an accessory component, such as lean burn system 16', utilizing electrical conductor 26 and contactor 29.

With the assembly 20 constructed as described above, as the operator of the motor vehicle moves the gear shift lever the rod 10' is reciprocated in dimension D. When the rod 10' is in a position such that the vehicle is in gear, a bare portion of the metal rod 10' engages the conductive fibers 32, completing the circuit to the lean burn system 16'. When the rod 10' is in a position such that the vehicle is out of gear, a non-conductive portion 28 engages the conductive fibers 32, breaking the circuit to the lean burn system 16'. During the entire selection process, the resilient fibers 30, 30' prevent ingress of contaminants into the housing 11', while the low-friction fibers 31 act as or are disposed over bearing ring 12' allow relatively friction free movement of the rod 10' in dimension D.

It will thus be seen that according to the present invention an advantageous fabric strip, particularly adapted for providing an advantageous transmission selector rod assembly, has been provided. The transmission selector rod assembly according to the invention has less weight, fewer component parts, provides a self-contained seal, and is relatively easy to install. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and assemblies.

What is claimed is:

1. A transmission selector rod assembly including
a housing;
a transmission selector rod;
means defining an opening into said housing for receipt of the transmission selector rod, to allow the selector rod to move with respect to said housing;
means for providing a seal at said opening to engage the selector rod and seal said housing from the surrounding environment, and including a pile fabric strip having at least some electrically conductive fibers, and means for mounting said fabric strip surrounding said opening so that the pile thereof, including at least some electrically conductive fibers, extends radially inwardly from a position surrounding said opening, to engage the selector rod when received within the opening; and
an electrical conductor electrically connected to said fabric strip and extending away from said housing, to provide an electric circuit with said fabric strip and an accessory electrical component.

2. An assembly as recited in claim 1 wherein the transmission selector rod is a metal rod which has a plurality of spaced electrically non-conductive portions formed on the surface thereof adjacent a portion thereof received by said opening in said housing.

3. An assembly as recited in claim 2 wherein said electrically conductive fibers in said pile fabric strip are in the form of a section of electrically conductive fibers of said fabric strip, the section having a predetermined width, and in contact with said selector rod; and wherein said non-conductive portions formed on the surface of said transmission selector rod have a width slightly greater than the width of said section of said conductive fibers.

4. An assembly as recited in claims 1 or 3 wherein said fabric strip includes at least a section thereof containing a backing, and wherein said means for mounting said fabric strip surrounding said opening includes a recessed portion of said housing, adjacent said opening, dimensioned to receive said backing therein while the fabric strip fiber pile extends outwardly therefrom.

5. An assembly as recited in claims 1 or 2 wherein said fabric strip comprises a first section including a resilient fiber pile, a second section including a low-friction fiber pile, a third section including a resilient fiber pile, and first section being disposed on the opposite side of said second section from said third section across a dimension of the fabric strip, and a fourth section including an electrically conductive fiber pile and wherein each said first and third sections are backed with a backing and said second section is not backed.

6. An assembly as recited in claim 5 wherein said resilient fiber pile is formed of fibers at least some of which selected from the group consisting essentially of silicone wool, natural wool, and fibers having resilient properties similar to silicone wool and natural wool; and wherein said low-friction fiber pile is formed of fibers selected from the group consisting essentially of polytetrafluoroethylene and fibers having friction properties similar to polytetrafluoroethylene.

7. An assembly as recited in claim 5 wherein said resilient fiber pile includes polypropylene fibers, and wherein said backing is polypropylene.

8. An assembly as recited in claim 5 wherein said rod is mounted for reciprocating back-and-forth movement with respect to said housing, and wherein said fourth section is disposed between said second and third sections across a dimension of said strip, encircling said rod.

9. An assembly as recited in claim 5 wherein said means for mounting said fabric surrounding said opening include a pair of recessed portions spaced from each other along the length of said opening, said first and third backings received by said recessed portions.

10. A fabric strip suitable for providing a seal between a housing and a member moveable with respect to said housing, which member extends through an opening in said housing, said fabric strip comprising: a pile fabric having a first section including a resilient fiber pile for providing a seal with the moveable member; a second section distinct from said first section and including a low-friction fiber pile for allowing low-friction movement of the moveable member without providing a seal; a third section distinct from said first and second sections and including a resilient fiber pile, said first, second, and third sections being disposed with said first section on the opposite side of said second section from said third section across a dimension of the fabric strip and said first, third, and second sections being immediately adjacent each other; and a fourth section including an electrically conductive fiber pile.

11. A fabric strip as recited in claim 10 wherein said fabric strip is woven or knit, and wherein said fourth section is disposed between said second and third sections across a dimension of the fabric strip.

12. A fabric strip as recited in claim 10 wherein said first and third sections each have a backing.

13. A fabric strip as recited in claim 11 wherein said second and fourth sections are unbacked.

14. A fabric strip as recited in claim 12 wherein said backing is polypropylene.

15. A fabric strip as recited in claim 14 wherein said first and third sections include polypropylene fibers therein.

16. A fabric strip as recited in claim 10 wherein said resilient fiber pile comprises a pile including silicone wool fibers.

17. A fabric strip as recited in claims 10 or 16 wherein said low-friction fiber pile comprises a pile including polytetrafluoroethylene fibers.

18. A fabric strip as recited in claim 10 wherein said fourth section includes stainless steel fibers.

19. A fabric strip suitable for providing a seal between a housing and a member moveable with respect to said housing, which member extends through an opening in said housing, said fabric strip comprising: a woven or knit pile fabric including a first section including a resilient fiber pile for providing a seal with the movable member, a second section distinct from said first section and including a low-friction fiber pile; and at least some electrically conductive fibers; said first and second sections being disposed next to each other across a dimension of the fabric strip.

20. A fabric strip as recited in claim 19 wherein said electrically conductive fibers are in the form of a section of a pile of electrically conductive fibers, distinct from said first and second sections, disposed next to said second section across a dimension of the fabric strip.

21. A fabric strip as recited in claim 19 wherein said fabric further comprises a third section including a resilient fiber pile, said third section, distinct from said first and second sections, being disposed on the opposite side of said second section from said first section.

22. A fabric strip as recited in claims 10 or 19 wherein said fabric strip has the plan configuration of a parallelogram.

* * * * *